(12) United States Patent
Bramah et al.

(10) Patent No.: US 9,329,631 B2
(45) Date of Patent: May 3, 2016

(54) TABLET COMPUTER HEATED CASE

(71) Applicant: Sealanes (1985) Pty Ltd, South Fremantle (AU)

(72) Inventors: John Bramah, Coogee WA (AU); Jim Catelli, Lynwood WA (AU); Vince Stackpole, Canning Vale WA (AU)

(73) Assignee: Sealanes (1985) Pty Ltd, South Fremantle, WA (AU)

( * ) Notice: Subject to any disclaimer, the term of this patent is extended or adjusted under 35 U.S.C. 154(b) by 137 days.

(21) Appl. No.: 14/100,152

(22) Filed: Dec. 9, 2013

(65) Prior Publication Data

US 2014/0293536 A1    Oct. 2, 2014

(30) Foreign Application Priority Data

Mar. 26, 2013   (AU) ................. 2013901039

(51) Int. Cl.
*G06F 1/16*   (2006.01)

(52) U.S. Cl.
CPC ...... G06F 1/1632 (2013.01); *G06F 2200/1633* (2013.01); *G06F 2200/1634* (2013.01)

(58) Field of Classification Search
USPC ..................... 439/668, 11, 517, 220, 34, 346; 348/373, 152, 143, 135, 187; 345/163, 345/175, 168, 173, 156, 169, 211, 82, 184, 345/77; 361/679.55, 679.02, 679.56, 361/679.47, 679.54, 679.09, 679.33, 361/679.53, 679.32, 679.4, 679.41, 679.43, 361/679.44, 679.21, 679.27, 679.05; 312/223.1, 223.6, 34.12, 247, 213, 312/223.3, 244

See application file for complete search history.

(56) References Cited

U.S. PATENT DOCUMENTS

| | | | |
|---|---|---|---|
| 2005/0219407 A1* | 10/2005 | Rice et al. | 348/373 |
| 2009/0034944 A1* | 2/2009 | Burtea et al. | 392/310 |
| 2012/0318780 A1* | 12/2012 | Juarez | 219/209 |
| 2013/0045641 A1* | 2/2013 | Schwarzbach et al. | 439/668 |
| 2013/0331724 A1* | 12/2013 | Altobelli et al. | 600/532 |

* cited by examiner

*Primary Examiner* — Hung Duong
(74) *Attorney, Agent, or Firm* — patenttm.us

(57) ABSTRACT

A tablet computer heated case has a body with a cavity in which a tablet computer may be received and includes a window to allow the screen of the tablet computer to be seen and to allow input to the tablet computer. A heating element may be provided opposite the window for heating a back face of the tablet computer when the tablet computer is in the cavity. A method of operating a tablet computer in an environment in which it is normally too cold for the tablet computer to operate employs the heated case by activating the heating element to warm the tablet computer.

13 Claims, 4 Drawing Sheets

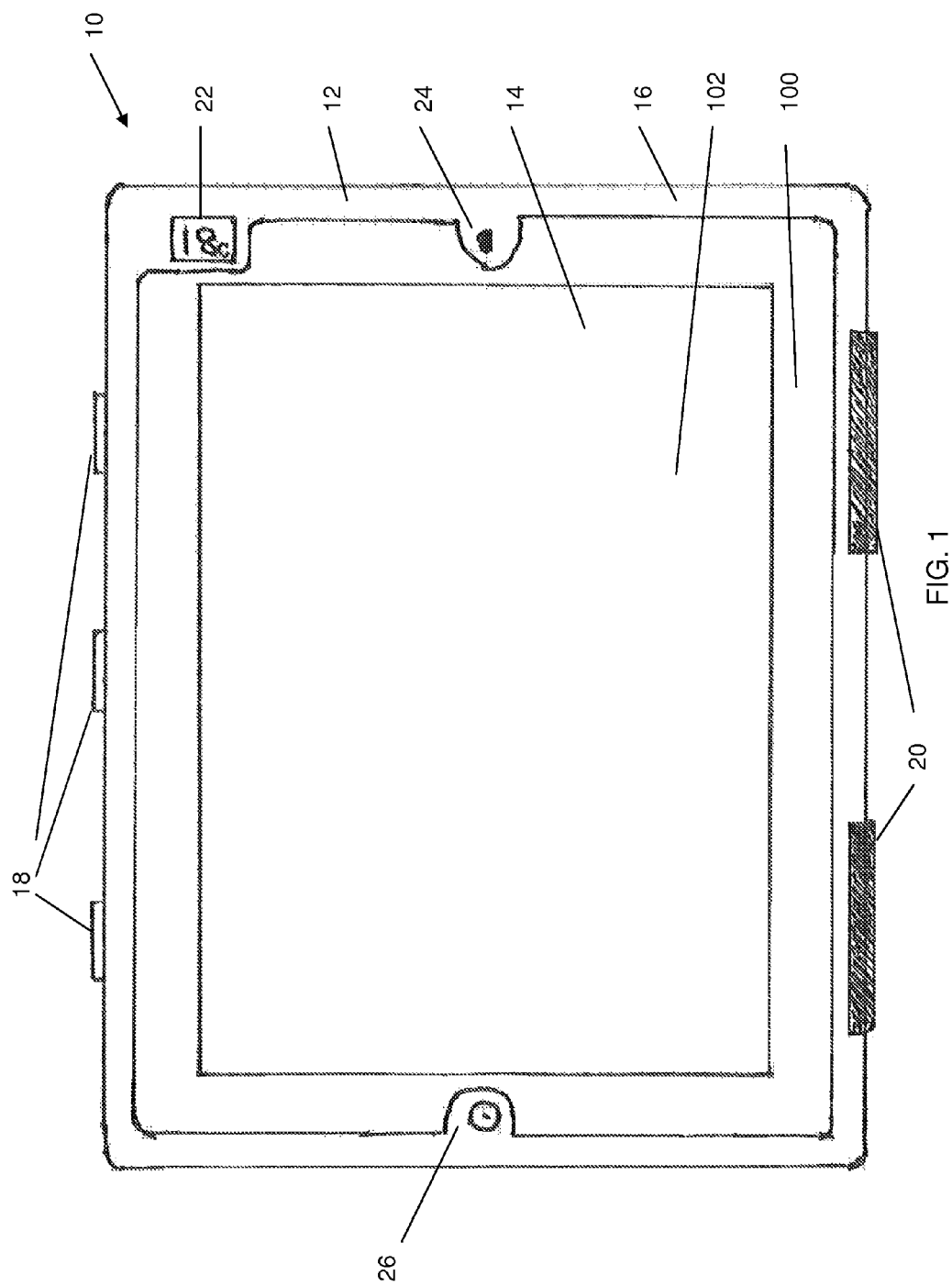

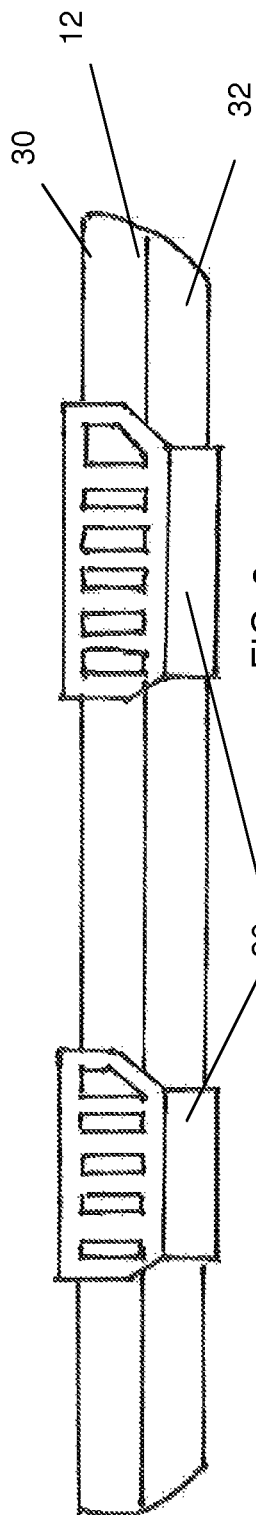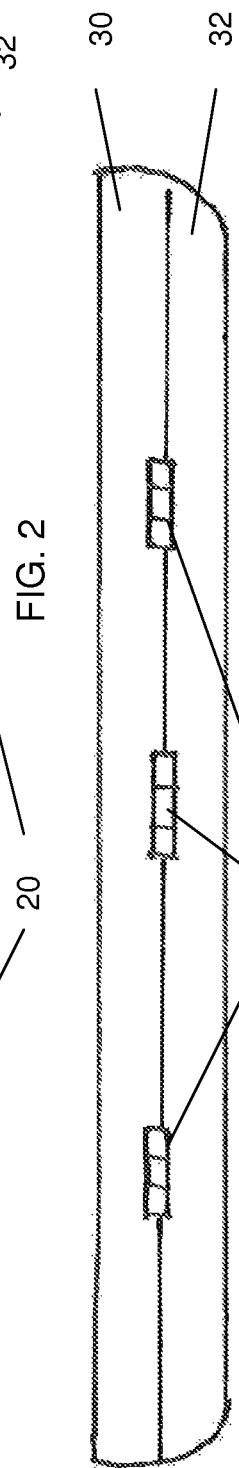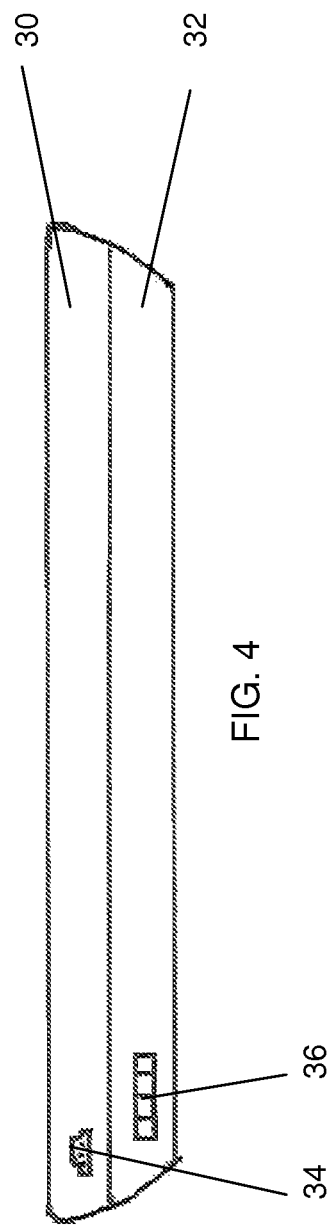

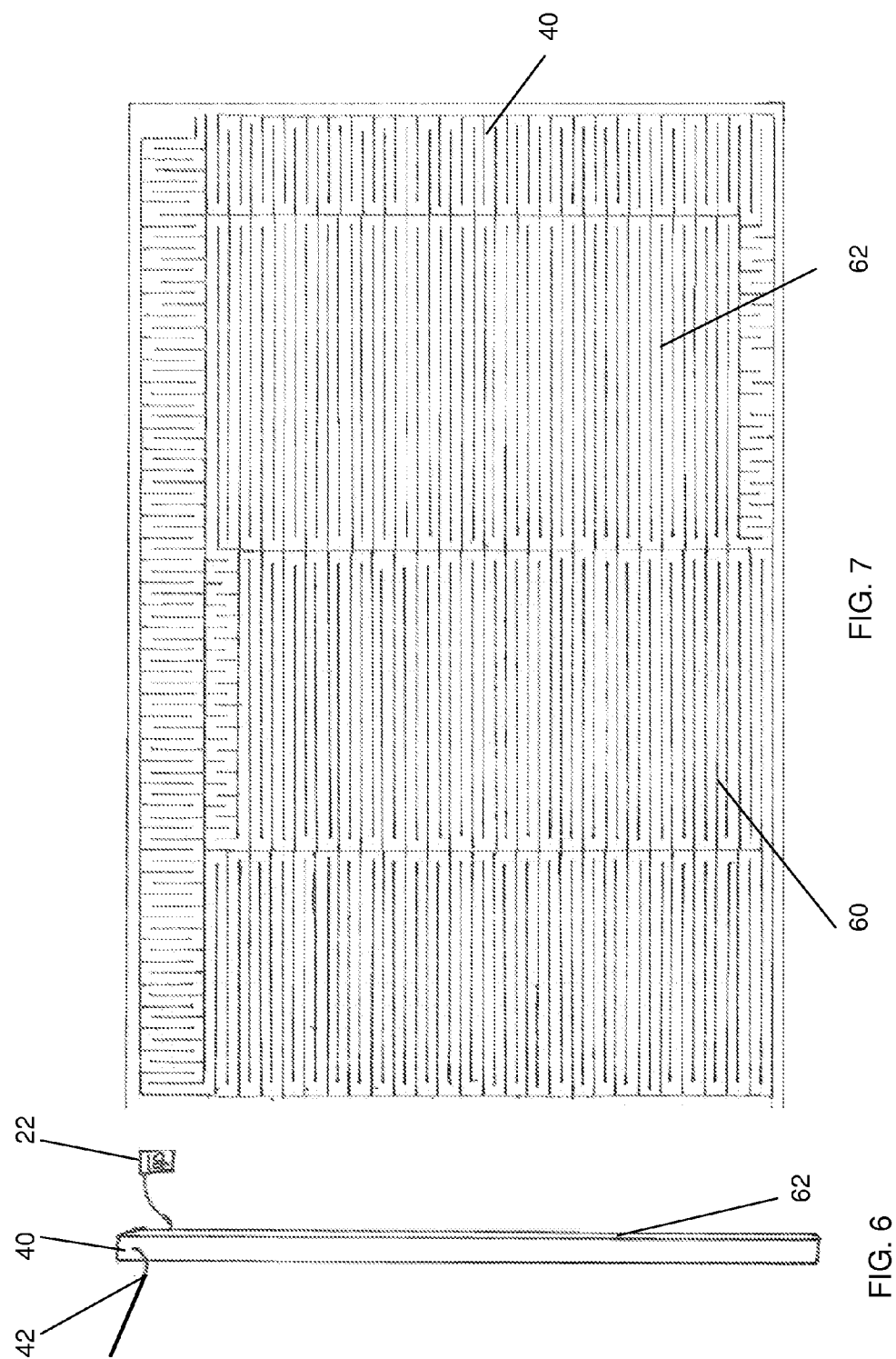

TABLET COMPUTER HEATED CASE

FIELD OF THE INVENTION

The present invention relates to a case for heating a tablet computer in below freezing conditions.

BACKGROUND

Walk-in freezers are common in food handling industries. Furthermore people also work in other environments that are below freezing (that is, below 0 degrees C.) for extended periods of time. For various purposes, such as for example stock control, people can need to use a portable computing device in freezers and in such cold environments for extended periods of time. Currently the only option available is a purpose build computer having self contained apparatus that allow these computers to operate in these sorts of temperatures. These are bulky and not as versatile as a tablet general purpose computer.

Tablet computers, such as an iPad™, are generally designed for operation down to about 0 degrees C. and have a non operating temperature down to −20 degrees C. Often industrial freezers operate below this temperature. Accordingly there is currently no possible way of using modern versatile tablet computers in these temperatures.

It is with this background that the present invention has been developed.

Reference to prior art documents is not an admission that they form part of the common general knowledge of a skilled person in any jurisdiction.

SUMMARY OF THE PRESENT INVENTION

According to one aspect of the present invention there is provided a heated case for a tablet computer comprising a body with a cavity in which a tablet computer may be received; a window to allow a screen of the tablet computer to be seen and to allow input to the tablet computer; and a heating element opposite the window for heating a back face of the tablet computer when the tablet computer is in the cavity.

In an embodiment the body further comprises a seal for sealing the cavity from the external atmosphere.

In an embodiment the window allows a touch input to a touch screen of the tablet computer.

In an embodiment the seal is between a front portion of the case and a front face of the tablet computer.

In an embodiment the seal is between a front portion of the case and a clear film positioned on the front face of the tablet computer.

In an embodiment the heating element comprises one or more resistive wires arrayed over the surface of the element, which when energised with an electrical current radiate heat.

In an embodiment the heating element comprises an electrically insulating layer over the wires.

In an embodiment the heating element is connected to an electrical power source.

In an embodiment the case comprises a socket for connection to an external electrical power source.

In an embodiment the electrical power source comprises a battery within the case.

In an embodiment the case comprises a thermometer for display of the temperature inside of the case.

In an embodiment the case comprises a thermo-controller for controlling the temperature inside of the case.

In an embodiment the case is comprises of a thermal insulating material for retaining heat inside the case.

In an embodiment the case is hinged on one edge and comprises one or more clamps on an opposite edge.

According to one aspect of the present invention there is provided a method of operating a tablet computer in an environment in which it is normally too cold for the tablet computer to operate, said method comprising:

providing a heated case comprising a body with a cavity in which a tablet computer may be received; a window to allow a screen of the tablet computer to be seen and to allow input to the tablet computer; and a heating element opposite the window for heating a back face of the tablet computer when the tablet computer is in the cavity, inserting the tablet computer inside the cavity; and activating the heating element to warm the tablet computer.

In this specification the terms "having", "comprising" or "comprises" are used inclusively and not exclusively or exhaustively.

DESCRIPTION OF DRAWINGS

In order to provide a better understanding of the present invention preferred embodiments will now be described, by way of example only, with reference to the accompanying drawings, in which:

FIG. 1 is a schematic plan view of a tablet computer heated case according to an embodiment of the invention fitted to a tablet computer;

FIG. 2 is a first side elevation of the case of FIG. 1;

FIG. 3 is a second side elevation of the case of FIG. 1, showing an opposite side of the case to FIG. 2;

FIG. 4 is an end view of the case of FIG. 1;

FIG. 6 is a side elevation of a heating element of the case of FIG. 1; and

FIG. 7 is a schematic plan view of the heating element of FIG. 6.

DESCRIPTION OF EMBODIMENTS OF THE INVENTION

Figure 5:
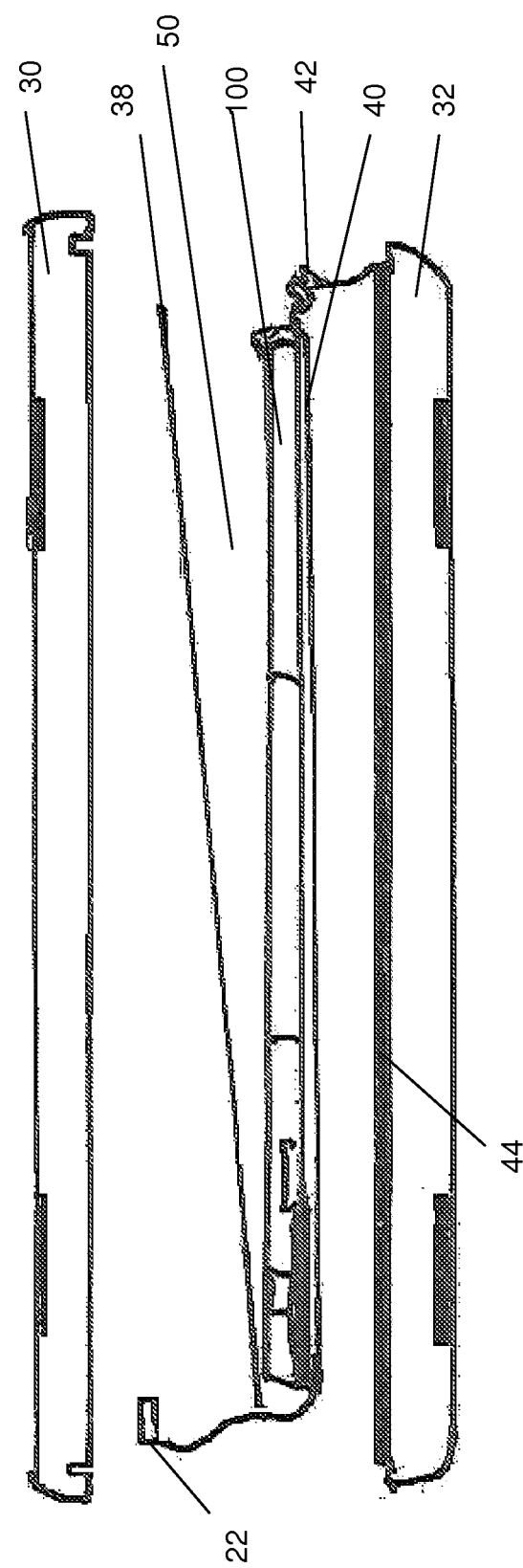
FIG. 5 is an exploded view showing parts of the case of FIG. 1 and the tablet computer.

Referring to the Figures there is shown a heated case 10 for a tablet computer, which comprises a body 12 with a cavity 50 in which a tablet computer 100 may be received. The body 12 is dimensioned according to the type and size of tablet computer 100 to be used.

In an embodiment the body 12 of the case 10 has a top part 30 connected to a bottom part 32 by a one or more hinges 18 on an edge of the case. In this example there are three hinges, but two hinges may also be commonly used. The parts 30 and 32 are held together with the tablet computer 100 in the cavity 50 by at least one clamp 20 or clasp on an opposite edge. In this example there are two clamps to maintain adequate clamping for the seals described further below to be more effective. The cavity 50 is between the parts 30 and 32 in FIG. 5 and will be enclosed by these parts when the parts 30 and 32 are closed.

The top part 30 of the body 12 has a window 14 to allow a screen 102 of the tablet computer 100 to be seen. The window 14 also allows input to the tablet computer 100, such as input to a touch screen 102 of the computer 100. The top part 30 also has a recess 24 to allow use of a camera of the tablet computer 100 and a recess 26 to allow use of a button of the tablet computer 100.

A thermometer sensor may be employed inside the case to measure the temperate of the tablet computer 100. In an embodiment the body 12 has a thermometer display 22 which displays the temperature inside the cavity 50. In this embodiment the display is in the front face of the top part 30.

In an embodiment a frame of the window 14 of the top part 30 has a seal on the underside that abuts the screen 102 of the tablet computer 100. This isolates the cavity 50 from the external atmosphere. Additionally a seal 44 is provided between the top part 30 and the bottom part 32 for sealing the cavity 50 from the atmosphere. Sealing of the cavity 50 may protect the tablet computer from moisture forming inside the case due to humidity and or temperature fluctuations.

A clear film 38 may be provided to cover the screen 102 of the tablet computer 100. The seal on the underside of the top part 30 around the frame of the window 14 will abut the film 38 when it is used. The film 38 may serve as a screen protector against physical damage and may also serve as a thermal insulator.

The top part 30 may be provided with a suitable plug (not shown) for connection to a socket in the tablet computer for transfer of power and or data. The plug is connected to a socket 34 to allow external connection to the tablet computer's data socket. The socket may be for example a micro USB connector, a 30-pin connector, or a Lightning connector, or may be of another form suitable for the type of tablet computer.3

A heating element 40 is provided in the bottom part 32, opposite the window 14, for heating a back face of the tablet computer 100 when the tablet computer is in the cavity 50. In an embodiment the heating element comprises one or more resistive wires 60 arrayed over the surface of the element, which when energised with an electrical current radiate heat. This heat is transferred to the back face of the tablet computer. When the back face of the tablet computer is made of metal this will aid in thermally conductivity of heat generated by the heating element into the tablet computer. In any case, due to the thin nature of tablet computers the heat is spread over the maximum surface area and has only a short distance to radiate through the inside of the tablet computer. This serves to keep the tablet computer within specified operating temperature despite the external atmospheric temperature being below 0 degrees C. The external conditions may be as low as −50 degrees C., or −40° C., −30° C., −25° C., −20° C., −15° C., −10° C., or −5° C., while the tablet computer is kept above 0° C. inside the case 10. The tablet computer may be at for example 1° C., 2° C., 3° C., 4° C., 5° C., 7° C., 10° C., 15° C., 18° C., 20° C., 22° C., or 25° C.

The temperature produced by the heating element may be thermostatically controlled, such as by controlling the current through the wires 60. The temperature may be factory set, say keep the tablet computer at at least 5 degrees. Alternatively the temperature may be user controlled. A simple version of the temperature control may employ an electronic circuit that switches on the heating element when the temperature of a semiconductor sensor drops below a lower threshold and switches off the heating element when the temperature of the semiconductor sensor rises above an upper threshold.

In an embodiment the heating element 40 comprises an electrically insulating layer 62 over the wires 60 so than in the event of the back face of the tablet computer 100 is made of metal they are not short circuited.

The heating element 40 is typically powered by an electrical power source. While it is possible to power the heating element 40 from the tablet computer 100 this would rapidly drain the tablet computer's battery. It is preferable that a separate power source be used. In one form the power source may be a battery disposed inside the body 12 of the case. The battery may be recharged from an external power source via a socket 36, such as a Molex socket.

In many applications however work is conducted with or near machinery which can provide external power. The battery capacity of an external power supply may be much greater than the capacity that can be provided by a battery inside the case 10. Accordingly many applications will not need a battery inside the case 10 and the power of the heating element can be provided solely from the external power source via the socket 36.

The heating element 40 may be similar to a mirror demister, such as is used on vehicle mirrors.

In an embodiment the body 12 is formed of a thermal insulating material, which is also resilient to impacts, such as a polycarbonate plastic. The body 12 may comprise a rubber outer and or inner coating to improve sealing and insulation. The body 12 may also or instead have a foamed plastics insulating layer.

The present invention allows use of a tablet computer in conditions that it would not normally be able to operate by providing a case in which the tablet computer is warmed to be within suitable operating temperatures. This allows the versatility available with tablet computers to be used in below freezing environments.

The present invention has application on a wide variety of tablet computers, the nature of which is not intended to be limiting. By way of example only the invention may have application for at least the following tablet computers: Apple™ iOS™ based tablet computers (iPad™), Android™ based tablet computers (eg Samsung Galaxy Tab), Microsoft™ Windows™ based tablet computers (eg Surface™ devices), Kindle™ devices, and Blackberry™ based tablet computers (eg Playbook™)

Modifications may be made to the present invention with the context of that described and shown in the drawings. Such modifications are intended to form part of the invention described in this specification.

The invention claimed is:

1. A tablet computer heated case comprising a body with a cavity in which a tablet computer may be received; a window to allow a screen of the tablet computer to be seen and to allow touch input to the tablet computer; and a heating element opposite the window for heating a back face of the tablet computer when the tablet computer is in the cavity.

2. A case according to claim 1, wherein the case further comprises a seal for sealing the cavity from the external atmosphere.

3. A case according to claim 2, wherein the seal is between a front portion of the case and a front face of the tablet computer.

4. A case according to claim 2, wherein the seal is between a front portion of the case and a clear film positioned on the front face of the tablet computer.

5. A case according to claim 1, wherein the heating element comprises one or more resistive wires arrayed over the surface of the element, which when energised with an electrical current radiate heat.

6. A case according to claim 5, wherein the socket is connected to a power input of the tablet computer.

7. A case according to claim 1, wherein the case comprises a socket for connection to an external electrical power source for powering the heating element.

8. A case according to claim 1, wherein the case comprises a thermometer for display of the temperature inside of the case.

9. A case according to claim 1, wherein the case comprises a thermo-controller for controlling the temperature inside of the case.

10. A case according to claim 1, wherein the case is comprises of a thermal insulating material for retaining heat inside the case.

11. A case according to claim 1, wherein the case is hinged on one edge and comprises one or more clamps on an opposite edge.

12. A method of operating a tablet computer in an environment in which it is normally too cold for the tablet computer to operate, said method comprising:
   providing a heated case comprising a body with a cavity in which a tablet computer may be received; a window to allow a screen of the tablet computer to be seen and to allow touch input to the tablet computer; and a heating element opposite the window for heating a back face of the tablet computer when the tablet computer is in the cavity,
   inserting the tablet computer inside the cavity; and
   activating the heating element to warm the tablet computer.

13. A case according to claim 1, wherein the heating element is arranged to be in contact with a back face of the tablet computer.

* * * * *